United States Patent
Bissantz

(10) Patent No.: US 10,762,463 B2
(45) Date of Patent: Sep. 1, 2020

(54) ELECTRONIC BOSS

(71) Applicant: Nicolas Bissantz, Nuremberg (DE)

(72) Inventor: Nicolas Bissantz, Nuremberg (DE)

(*) Notice: Subject to any disclaimer, the term of this patent is extended or adjusted under 35 U.S.C. 154(b) by 1003 days.

(21) Appl. No.: 14/471,386

(22) Filed: Aug. 28, 2014

(65) Prior Publication Data

US 2016/0063426 A1  Mar. 3, 2016

(51) Int. Cl.
*G06Q 10/06* (2012.01)
*H05B 47/105* (2020.01)

(52) U.S. Cl.
CPC ... *G06Q 10/06398* (2013.01); *G06Q 10/0639* (2013.01); *H05B 47/105* (2020.01)

(58) Field of Classification Search
None
See application file for complete search history.

(56) References Cited

U.S. PATENT DOCUMENTS

| | | | | |
|---|---|---|---|---|
| 5,498,931 A * | 3/1996 | Bedocs | | H05B 41/36 315/158 |
| 8,334,871 B2 * | 12/2012 | Hamilton, II | | G06F 3/04815 345/473 |
| 9,137,878 B2 * | 9/2015 | Thompson | | H05B 47/105 |
| 9,635,740 B2 * | 4/2017 | Sun | | H05B 45/00 |
| 9,717,132 B2 * | 7/2017 | Sun | | H05B 47/12 |
| 9,795,004 B2 * | 10/2017 | Blum | | H05B 45/20 |
| 9,924,021 B2 * | 3/2018 | Breton | | H04M 1/7253 |
| 10,086,275 B2 * | 10/2018 | Edelman | | A63F 13/26 |
| 10,368,424 B2 * | 7/2019 | Engelen | | H05B 47/19 |
| 10,465,882 B2 * | 11/2019 | Engelen | | H05B 45/10 |
| 10,547,936 B2 * | 1/2020 | Nagel | | H04R 25/40 |
| 2004/0039254 A1 * | 2/2004 | Stivoric | | A61B 5/0205 600/300 |
| 2006/0041845 A1 * | 2/2006 | Ferguson | | G06F 9/4443 715/751 |
| 2007/0112612 A1 * | 5/2007 | Dollens | | G06Q 10/06311 705/7.13 |

(Continued)

OTHER PUBLICATIONS

Intelligent Computing in Engineering and Architecture, 13th EG-ICE Workshop 2006. Ascona, Switzerland, Ian F. C. Smith (Ed.), Springer, Jun. 2006. (Year: 2006).*

(Continued)

*Primary Examiner* — Stephanie Z Delich
(74) *Attorney, Agent, or Firm* — Dilworth & Barrese, LLP.; Michael J. Musella, Esq.

(57) ABSTRACT

The invention relates to a system comprising a storage means, a calculating means and a reproduction means, the calculating means being capable of assigning quantitative data, which are representative of an employee's success at work, to one of at least two categories; the storage means comprising at least two different exhibits starring a boss, the exhibits being representative of the boss's different emotional states, and at least one of the exhibits being assigned to each of the categories; and the reproduction means being capable of presenting any of the stored exhibits to the employee; wherein the system is configured such that it selects a certain exhibit based on the employee's success at work and presents the selected exhibit to the employee; and wherein the exhibit is selected from the group consisting of images, video sequences, or audio sequences starring the real life boss.

20 Claims, 2 Drawing Sheets

(56) References Cited

U.S. PATENT DOCUMENTS

| | | | | |
|---|---|---|---|---|
| 2008/0151038 A1* | 6/2008 | Khouri | ............... | H04N 7/147 348/14.01 |
| 2008/0190138 A1* | 8/2008 | DiCiacco | ............ | G01K 11/165 63/14.9 |
| 2009/0234639 A1* | 9/2009 | Teague | ............... | G06F 17/2881 704/9 |
| 2010/0083138 A1* | 4/2010 | Dawson | ................ | A63F 13/12 715/757 |
| 2013/0134902 A1* | 5/2013 | Mahale | ............. | H05B 37/0227 315/297 |
| 2014/0129942 A1* | 5/2014 | Rathod | ........... | H04N 21/44222 715/720 |
| 2014/0245784 A1* | 9/2014 | Proud | ................. | A44C 5/0015 63/1.11 |
| 2014/0253469 A1* | 9/2014 | Hicks | ................ | G06F 3/03545 345/173 |
| 2014/0354160 A1* | 12/2014 | Aggarwal | ........... | H05B 47/155 315/152 |
| 2014/0354187 A1* | 12/2014 | Aggarwal | ........... | H05B 47/175 315/312 |
| 2014/0358285 A1* | 12/2014 | Aggarwal | ............. | H05B 47/19 700/275 |
| 2014/0359018 A1* | 12/2014 | Sun | ...................... | H04L 65/403 709/204 |
| 2015/0336421 A1* | 11/2015 | Neubauer | ............. | G09B 11/00 434/159 |

OTHER PUBLICATIONS

Stampleton, Andrew J. Serious Games: Serious Opportunities. Swinburne University of Technology. Australian Game Developers' Conference, Academic Summit, Melbourne, 2004. (Year: 2004).*

* cited by examiner

ELECTRONIC BOSS

Background of the Invention

The present invention relates to an innovative means for giving feedback to employees.

A person's reaction, for example a person's facial expression sends very strong signals to other persons. Evolution has ensured that the human brain is especially skilled at capturing and correctly interpreting non-verbal signals (in general) and facial expressions (in particular) of a person standing across from us. This holds true in good and bad scenarios. What's truly fascinating is the impulse that a simple, genuine smile can have on a person's demeanor. Everyone knows what a smile of a valued person means, and one from a stranger doesn't leave us cold either. If we make someone laugh, on the other hand, we are proud and feel like laughing, too. Making someone laugh is almost a virtue of its own.

Summary of the Invention

The idea of the present invention is to leverage this phenomenon to fill motivational deficits among employees. An animated version of the boss shall be used to trigger the same feelings as the real one.

Against this background, the invention provides for a system comprising a storage means, a calculating means and a reproduction means. The calculating means is capable of assigning quantitative data to one of at least two categories. The quantitative data are representative of an employee's success at work. The storage means comprises at least two different exhibits starring a boss. These exhibits are representative of the boss's different emotional states. At least one of the exhibits is assigned to each of the categories. The reproduction means is capable of presenting any of the stored exhibits to the employee. The system is configured such that it selects a certain exhibit based on the employee's success at work and presents the selected exhibit to the employee.

Importantly, the exhibit is selected from the group consisting of images, video sequences, or audio sequences starring the real life boss. In contrast to using icons like Chernoff-Faces to illustrate facial expressions, but the concept of the present invention is restricted to using real life avatars, i.e. representations such as photographs, videos, real voice recordings of the boss. Only a real life avatar can trigger the same emotions as the real boss.

Accordingly, the images may be photographs illustrating the boss, the video sequences may be video recordings starring the boss and the audio sequences may be voice recordings starring the boss.

The concept of the present invention is not restricted to certain types of boss-employee relationships. It may be between a direct or higher hierarchical superior (boss) and an employee within a company, firm etc. It may also be a freelance relationship between any principal (boss) and any agent (employee).

The images or video sequences may show the boss's face and illustrate his or her mimics, facial expressions and/or gestures. The boss or the boss's face may be shown larger than life to create a more prominent impression.

The images or video sequences may illustrate emotions by illustrating the boss smiling, frowning, giving thumps-up or thumbs-down, nodding, shaking his or her head, giving applause, cutting capers, dancing, yawning, dozing off, waking up, staring and the like. The audio sequences may reproduce emotions by reproducing the boss expressing words, phrases or sentences of approval or disapproval (e.g., Yeah!).

All or at least the majority of the exhibits may be representative of the boss's positive emotional states. Positive feedback has proven to be a better motivator than negative feedback.

The reproduction means may include an image reproduction means and/or a sound reproduction means. The image reproduction means may be a 2D display or a set of displays, but can also be a 2D projection, 3D projection or the like. The sound reproduction means may be a speaker or a set of speakers.

In a preferred embodiment, the image reproduction means is the employee's workplace computer screen. For example, an image or video sequence starring the boss can permanently be displayed in part of the screen or can be flashed or displayed for a brief amount of time in part of the screen or over the full employee's workplace computer screen. Alternatively, also separate screens may be used to present image or video sequences to the employee.

The system may be configured such that in at least part of the screen of the image reproduction means the characteristic of the displayed image is changed depending on the employee's success at work. The change in characteristic may include coloring of at least part of the displayed image. For example, the illustration of the boss can be highlighted in a color such as red (angry boss) or blue (satisfied boss). Alternatively, the whole area or part of the image displayed on the image reproduction means may be highlighted in a color. The coloring hence may include any information displayed on the image reproduction means. Preferably, coloring is temporary. Partial coloring may, for example, include color-framing the displayed information.

As to the number of categories representative of the employee's success at work, there may be more than two categories, e.g. three, four, five or more than five categories. Categories can include a category of disapproval, a category of boredom, a category of neutral attitude, a category of excitement and the like. There may be one exhibit assigned to a category or there may be more exhibits assigned to a category. In case there are more exhibits assigned to one category, the exhibits assigned to the same category are representative, approximately, of the same emotional state of the boss.

Suitable choices for quantitative data representative of an employee's success at work may be selected from the group consisting of completing a certain number of tasks on a to-do list, completing and distributing a certain number of publications on a schedule, solving a certain number of customer problems, recording a step of success in a customer acquisition process and completing a certain number of tasks such as phone calls, emails or project steps. Also the change of such data over time can be considered.

The quantitative data representative of an employee's success at work may be assigned to a category on the basis of their comparison to a set point value. For example, it can be checked whether they have exceeded or fallen below a corresponding set point value, how close they have approached a corresponding set point value or how far they have exceeded a set point value.

The system may further comprise an input means, the input means configured such that the employee and/or the boss can chose the kind of quantitative data used and/or define a set point value. As such, the definition of success can be individually defined, e.g. by the employee himself.

In a further embodiment, the system may further comprise a lighting system for the employee's office room, the lighting system comprising one or more light sources and being capable of emitting light of different characteristic to the office room, wherein the system is configured such that the characteristic of the light emitted to the office room is changed depending on the employee's success at work. The characteristic of the light may be selected from the group consisting of the brightness of the light, color of the light and color intensity of the light. For example, the light emitted to the office room may be red (angry boss) or blue (satisfied boss). The light change may be performed in short intervals, e.g., concurrently with presenting the exhibit starring the boss. This embodiment is oriented on the concept of so-called mood lighting. The office room may be lighted by the lighting system only. The inventive system may effect that the office room is bathed in different colors or brightness depending on the boss's mood. For example, the lighting system may be adapted so as to emit light of a certain color, such as red, if the boss's mood is bad, and to emit light of another color, such as blue, if the boss's mood is good. The same may apply not only for the color of light, such as red or blue, but as well for any characteristic of the light, such as the brightness of the light. Accordingly, for example a boss's good mood is always linked to blue light, however, the brightness and/or color intensity of the light may be dependent on how good the mood is. Similarly, for example a boss's bad mood is always linked to red light, however, the brightness and/or color intensity of the light may be dependent on how bad the boss's mood is. The light system may comprise any light source available on the market. It is preferred that the individual light sources are capable of producing light of different characteristic, e.g., light of different color or brightness. This avoids having to use one light source for every light characteristic. However, some light systems may comprise a plurality of different colored LEDs, e.g., red and blue LEDs which are individually or collectively emit light. The light system can be the only light source in the office room and can be switched between normal mode (constant light of neutral color) and mood lighting. The lighting system may be adapted so as to provide only two colors and/or degrees of brightness of light, wherein, e.g., the two colors may be blue and red. Of course the use of a higher number of colors and/or degrees of brightness is conceivable and part of the invention as well.

Against the background rendered in the introductory portion, the invention further provides a method of giving feedback to an employee at a worksite, the method comprising
(a) stocking at least two different exhibits starring a boss, the exhibits being representative of the boss's different emotional states, and the exhibits being selected from the group consisting of images, video sequences, or audio sequences starring the real life boss;
(b) assigning at least one of the exhibits to each of the categories;
(c) assigning quantitative data, which are representative of an employee's success at work, to one of at least two categories;
(d) selecting a certain exhibit based on the employee's success at work; and
(e) presenting the selected exhibit to the employee.

Further optional details to the method correspond to the optional details explained in connection with the system of the invention.

Still further, the invention relates to using the system of the invention to give feedback to an employee at a worksite.

Brief Description of the Drawings

Further details and advantages of the invention will become apparent by way of the example and figures described in the following. The figures show.

Figure 1:
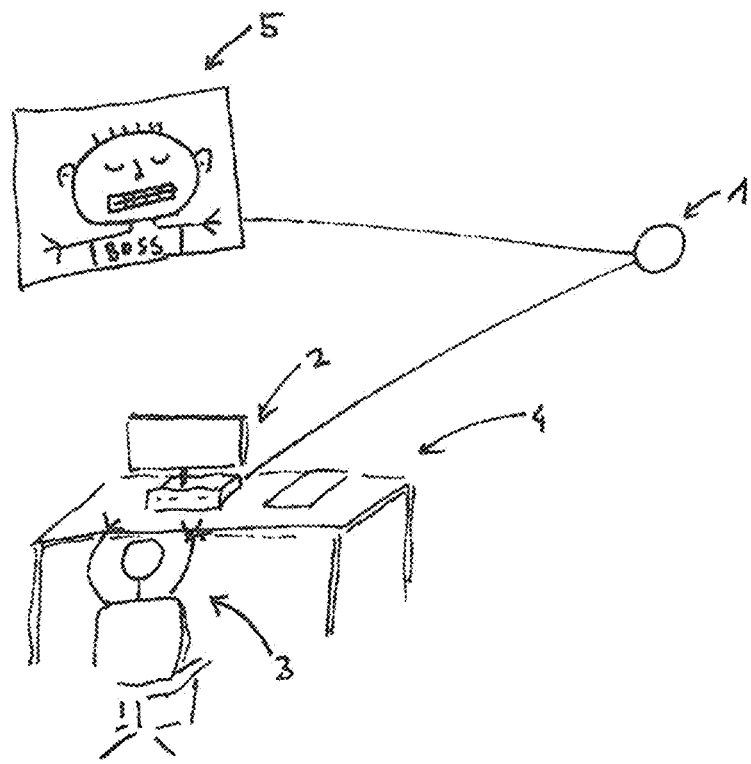
FIG. 1: schematic illustration of a system according to the invention.

The Figure illustrates a system according to the present invention which comprises a calculating unit 1 comprising a storage means and a calculating means.

The storage means stores a number of digital photographs of a senior manager of a company. The digital photographs show a close-up of the face of a senior manager in different emotional states. There are photographs of the manager frowning, yawning, smiling, laughing and the like. The storage means is configured such that subgroups of photographs, which are representative of approximately the same emotional state in terms of satisfaction with an employee's work, are assigned to certain categories.

The calculating means is connected to a computer 2 on the worksite 4 of an employee 3. It obtains quantitative data from the computer 2, which indicates how many tasks on a to-do list the employee 3 has completed. The calculating means compares this number with a certain set point value. In case the comparison reveals that the number is below the set point, the calculating means selects a photography from a low category, e.g. a category named "bored". This may be a photography of the senior manager yawning. In case the comparison reveals that the number is above the set point, the calculating means selects a photography from a higher category, e.g. a category named "satisfied". This may be a photography of the senior manager smiling.

The selected photograph is then displayed on an LED display 5, which is connected to the calculating unit 1. In the illustrated embodiment, the display 5 is located a few meters from the worksite 4 and is different from the computer display 2 the employee 3 has at his worksite 4. However, the display used for presenting the exhibit of the boss may also simply be the employee's workplace computer screen belonging to computer 2. The display, in the given example, is a 2D LED display. The photography is illustrated at a scale larger than life.

Of course, the calculating unit 1 can be identical to the worksite computer 2 or the existing centralized computer system of the company. Therefore, the calculating unit 1 can include a memory, a processor, and an input (for example, a keyboard or a mouse).

The invention envisions a large screen showing the face of the boss, e.g. a senior manager. The screen stands a few meters away, but every time people look up from their work, they see it. The picture isn't static. It changes with each success made on the job.

Figure 2:
FIG. 2: an image as presented by the system of the invention showing a boss looking bored.

FIG. 2 illustrates a possible avatar picture of a boss. A single look suffices to know that he is not paying the least bit of attention to the person observing him. The category to which this image is assigned may be "bored", when work progress is slow or no goals have yet been achieved.

Figure 3:
FIG. 3: an image as presented by the system of the invention showing a boss smiling.

FIG. 3 illustrates another possible avatar picture of the same boss. The smile proves that the employee now has the man's full attention and empathy. The category to which this image is assigned may be "satisfied", when work progress is good and some goals have been achieved.

Figure 4:
FIG. 4: an image as presented by the system of the invention showing a boss looking excited.

FIG. 4 illustrates yet another possible avatar picture of the same boss. The boss is apparently very excited. Some special achievement may have been made.

Success, in this case, needs to be quantitative. There are many possibilities to do that: from completing x-number of tasks on a to-do list, distributing publications on schedule, and solving customer problems to implementing changes in the software, recording successes in the customer acquisition process, or even completing phone calls, e-mails, project steps, and so on.

Each employee can personally agree to the goals with the boss avatar. The respective parameter settings may be configured to give a grin when a support case has been closed or to give a big smile when ten of them have been closed.

A simulated boss who acknowledges progress works because human feelings do not really differentiate between perception and real experience. The intense perception of an experience can even exceed the real experience itself.

The invention claimed is:

1. A system for providing feedback to an employee, comprising:
    a processor configured to assign quantitative data, which are representative of an employee's success at work, to one of at least two categories, wherein said quantitative data measures an employee's successful completion of assigned problems;
    the processor being further configured to determine art emotional state based on a degree of successful completion of the assignated tasks and problems by the employee;
    a memory for storing at least two different exhibits starring an electronic boss, the exhibits being representative of the electronic boss's different emotional states, and at least one of the exhibits being assigned to each of the categories, wherein the electronic boss is an electronic representation of a real-life boss tasked to create said assigned tasks and problems or the employee to carry out, the employee is tasked to successfully complete the assignments created by the boss, under supervision of the real-life boss;
    a display for displaying any of the stored exhibits to the employee,
    a lighting system for an office room of the employee, the lighting system being adapted to emit light of different characteristics to the office room of the employee depending on the electronic boss' emotional states,
    wherein the system is configured such that it selects a certain exhibit from the memory representative of an emotional state associated with the electronic boss, wherein said selection is based on the employee's degree of successful completion of the assigned tasks and problems and presents the selected exhibit of the electronic boss to the employee; and
    wherein the exhibit is selected from a group consisting of images, video sequences, or audio sequences starring the real-life boss.
2. The system of claim 1, wherein the images are photographs illustrating the boss.
3. The system of claim 1, wherein the video sequences are video recordings starring the boss.
4. The system of claim 1, wherein the images or video sequences show the boss's face and illustrate his or her mimics, facial expressions and/or gestures.
5. The system of claim 1, wherein the images or video sequences illustrate emotions by illustrating at least one of emotions of the boss smiling, frowning, giving thumps-up or thumbs-down, nodding, shaking his or her head, giving applause, cutting capers, dancing, yawning, dozing off, waking up, and staring.
6. The system of claim 1, wherein the images or video sequences show the boss in a size greater than life-size.
7. The system of claim 1, wherein the audio sequences are voice recordings starring the boss.
8. The system of claim 1, wherein the audio sequences reproduce emotions by reproducing the boss expressing words, phrases or sentences of approval or disapproval.
9. The system of claim 1, wherein exhibits are representative of the boss's positive emotional states.
10. The system of claim 1, wherein the display is a projection.
11. The system of claim 1, wherein the display is the employee's workplace computer screen.
12. The system of claim 11, wherein the system is configured such that in at least part of a screen of the display a characteristic of the displayed image is changed depending on the employee's success at work.
13. The system of claim 12, wherein the change in characteristic includes coloring of at least part of the displayed image.
14. The system. of claim 1, wherein the system further includes at least one speaker.
15. The system of claim 1, wherein the quantitative data representative of an employee's success at work are selected from a group consisting of completing a certain number of tasks on a to-do list, completing and distributing a certain number of publications on a schedule, solving a certain number of customer problems, recording a step of success in a customer acquisition process and completing a certain number of tasks that include at least one of phone calls, emails or project steps.
16. The system of claim 1, wherein the quantitative data representative of an employee's success at work are assigned to a category on the basis of their comparison to a set point value.
17. The system of claim I, further comprising an input for choosing the kind of quantitative data used and/or define a set point value.
18. The system of claim 1, Wherein the lighting system comprising one or more light sources and emitting, using at least one of the one or more light sources, the light of different characteristics to the office room further depending on the employee's success at work.
19. The system of claim 18, wherein the characteristic of the light is selected from the group consisting of the brightness of the light, color of the light and color intensity of the light.
20. A method of giving feedback to an employee at a worksite, the method comprising the steps of:
    storing in a memory at least two different exhibits starring an electronic boss, the exhibits being representative of the electronic boss's different emotional states, and the exhibits being selected from a group consisting of images, video sequences, or audio sequences starring the electronic boss, wherein the electronic boss is an electronic representation of a real-life boss, and the employee is under supervision of the real-life boss tasked to create said assigned tasks and. problems for the employee to carry out:

assigning at least one of the exhibits to each of two categories;

assigning quantitative data, which are representative of an employee's success at work, to one of the at least two categories, wherein said quantitative data measures an employee's successful conviction of assigned tasks and successful resolution of assigned problems to solve;

selecting by a processor a certain exhibit based on the employee's success at work wherein said selection is based on the employee's degree of successful completion of the assigned tasks and problems and presents the selected exhibit of the electronic boss to the employee;

determining by said processor, an emotional state based on a deuce of successful completion of the assigned tasks and problems by the employee;

displaying on a display the selected exhibit to the employee; and emitting, by a lighting system, light of different characteristics to an office room of the employee depending on the electronic boss' emotional states.

\* \* \* \* \*